US010811700B2

(12) United States Patent
Tomana et al.

(10) Patent No.: US 10,811,700 B2
(45) Date of Patent: Oct. 20, 2020

(54) FUEL CELL SEPARATOR AND POWER GENERATION CELL

(71) Applicant: HONDA MOTOR CO., LTD., Minato-ku, Tokyo (JP)

(72) Inventors: Yu Tomana, Wako (JP); Kentaro Ishida, Wako (JP); Satoshi Oyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 129 days.

(21) Appl. No.: 16/120,534

(22) Filed: Sep. 4, 2018

(65) Prior Publication Data

US 2019/0074524 A1    Mar. 7, 2019

(30) Foreign Application Priority Data

Sep. 7, 2017    (JP) ................................ 2017-171678

(51) Int. Cl.
*H01M 8/026* (2016.01)
*H01M 8/0276* (2016.01)

(52) U.S. Cl.
CPC ......... *H01M 8/026* (2013.01); *H01M 8/0276* (2013.01)

(58) Field of Classification Search
CPC .. H01M 8/026; H01M 8/0276; H01M 8/2457; H01M 8/2483; H01M 8/1007; H01M 8/0254; H01M 8/0258; H01M 8/0267; H01M 8/1004; H01M 8/241; H01M 8/247

USPC ......................................................... 429/147
See application file for complete search history.

(56) References Cited

U.S. PATENT DOCUMENTS

| 7,718,293 | B2 | 5/2010 | Strobel et al. | |
| 2015/0064590 | A1* | 3/2015 | Numao | H01M 8/026 429/432 |
| 2016/0260987 | A1* | 9/2016 | Watanabe | H01M 8/2465 |

FOREIGN PATENT DOCUMENTS

| CA | 2998901 | | 3/2017 |
| JP | 2006228533 A | * | 8/2006 |

OTHER PUBLICATIONS

Japanese Office Action for Japanese Patent Application No. 2017-171678 dated Mar. 5, 2019.

* cited by examiner

*Primary Examiner* — Gary D Harris
(74) *Attorney, Agent, or Firm* — Amin, Turocy & Watson, LLP

(57) ABSTRACT

A first metal separator of a power generation cell includes an oxygen-containing gas supply passage extending through the first metal separator in a separator thickness direction, a passage bead formed around the oxygen-containing gas supply passage, and a plurality of tunnels protruding from a side wall of the passage bead and expanded in the separator thickness direction. The plurality of tunnels have the same shape in cross section of a root connected to the passage bead.

6 Claims, 9 Drawing Sheets

FUEL CELL SEPARATOR AND POWER GENERATION CELL

CROSS-REFERENCE TO RELATED APPLICATION

This application is based upon and claims the benefit of priority from Japanese Patent Application No. 2017-171678 filed on Sep. 7, 2017, the contents of which are incorporated herein by reference.

BACKGROUND OF THE INVENTION

Field of the Invention

The present invention relates to a fuel cell separator including a bead seal around a fluid passage. Further, the present invention relates to a power generation cell.

Description of the Related Art

For example, a solid polymer electrolyte fuel cell employs a membrane electrode assembly (MEA). The membrane electrode assembly includes an electrolyte membrane, an anode provided on one side of the electrolyte membrane, and a cathode on the other side of the electrolyte membrane. The electrolyte membrane is a polymer ion exchange membrane. The membrane electrode assembly is sandwiched between separators (bipolar plates) to form a power generation cell (unit cell). In use, a predetermined number of power generation cells are stacked together to form a fuel cell stack mounted in a fuel cell vehicle (fuel cell electric automobile).

In the fuel cell stack, as the separators, metal separators may be used. In this case, seal members are provided for the metal separators, so as to prevent leakage of reactant gases (oxygen-containing gas and fuel gas) and a coolant.

As the seal members, elastic rubber seals such as fluorine rubbers or silicone rubbers have been used. However, the use of such rubbers pushes up the cost. In an attempt to address the problem, for example, U.S. Pat. No. 7,718,293 described below discloses structure where ridge shaped bead seals are formed in the metal separator, instead of elastic rubber seals.

SUMMARY OF THE INVENTION

In order to supply and discharge the reactant gases and the coolant, respectively, fluid passages are provided for the stack body of the power generation cells. The fluid passages extend through the metal separators in the stacking direction. The fluid passages in the metal separators are surrounded by bead seals, respectively. In order to allow the reactant gases to flow between the power generation area and the fluid passages, connection channels (bridge sections) are provided. The connection channels extend or connect between the inside and the outside of the bead seals. The surface pressure applied to the bead seal (contact pressure at the front end of the bead seal) is influenced by the shape in cross section of a connection channel connected to the bead seal. It is desired to suppress variation of the surface pressure applied to the bead seal.

An object of the present invention is to provide a fuel cell separator and a power generation cell having simple and economical structure in which the uniform surface pressure is applied to a bead seal around a fluid passage.

In order to achieve the above object, the present invention provides a fuel cell separator. The fuel cell separator includes a fluid flow field configured to allow fluid of an oxygen-containing gas, a fuel gas, or a coolant to flow along an electrode surface, a fluid passage connected to the fluid flow field and extending through the fuel cell separator in a separator thickness direction, and a bead seal used for sealing. The bead seal is formed around the fluid passage and protruding in the separator thickness direction. The fuel cell separator is stacked on a membrane electrode assembly, and a compression load is applied to the fuel cell separator in a stacking direction. A plurality of tunnels protrude from a side wall of the bead seal, and the tunnels are expanded in the separator thickness direction. The plurality of tunnels have same shape in cross section of a root connected to the bead seal.

Preferably, each of the plurality of tunnels may have a trapezoidal shape in cross section, and the plurality of tunnels may have same bottom side length, same upper side length, and same height.

Preferably, the plurality of tunnels may include a plurality of inner tunnels protruding from an inner side wall of the bead seal and a plurality of outer tunnels protruding from an outer side wall of the bead seal, and the plurality of inner tunnels and the plurality of outer tunnels may be connected to the bead seal alternately.

Preferably, the plurality of tunnels may include an inner tunnel protruding from an inner side wall of the bead seal and an outer tunnel protruding from an outer side wall of the bead seal, and the inner tunnel and the outer tunnel may have same shape in cross section of a root connected to the bead seal.

Preferably, another fuel cell separator is provided adjacent to the fuel cell separator, and the plurality of the tunnels of the fuel cell separator and a plurality of tunnels of the other fuel cell separator may have same shape in cross section.

A power generation cell of the present invention includes any of the above fuel cell separators, and a membrane electrode assembly stacked on the fuel cell separator.

In the fuel cell separator and the power generation cell of the present invention, the plurality of tunnels connected to the bead seal around the fluid passage have the same shape in cross section of the root connected to the bead seal. In the structure, variation in the rigidity of the bead seals at positions connected to the tunnels is suppressed. Therefore, it is possible to achieve simple and economical structure where the uniform surface pressure (seal surface pressure) is applied to the bead seals around the fluid passages. Further, it is possible to achieve the desired sealing performance by the bead seals easily.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, preferred embodiments of a fuel cell separator and a power generation cell according to the present invention will be described with reference to the accompanying drawings.

Figure 1:
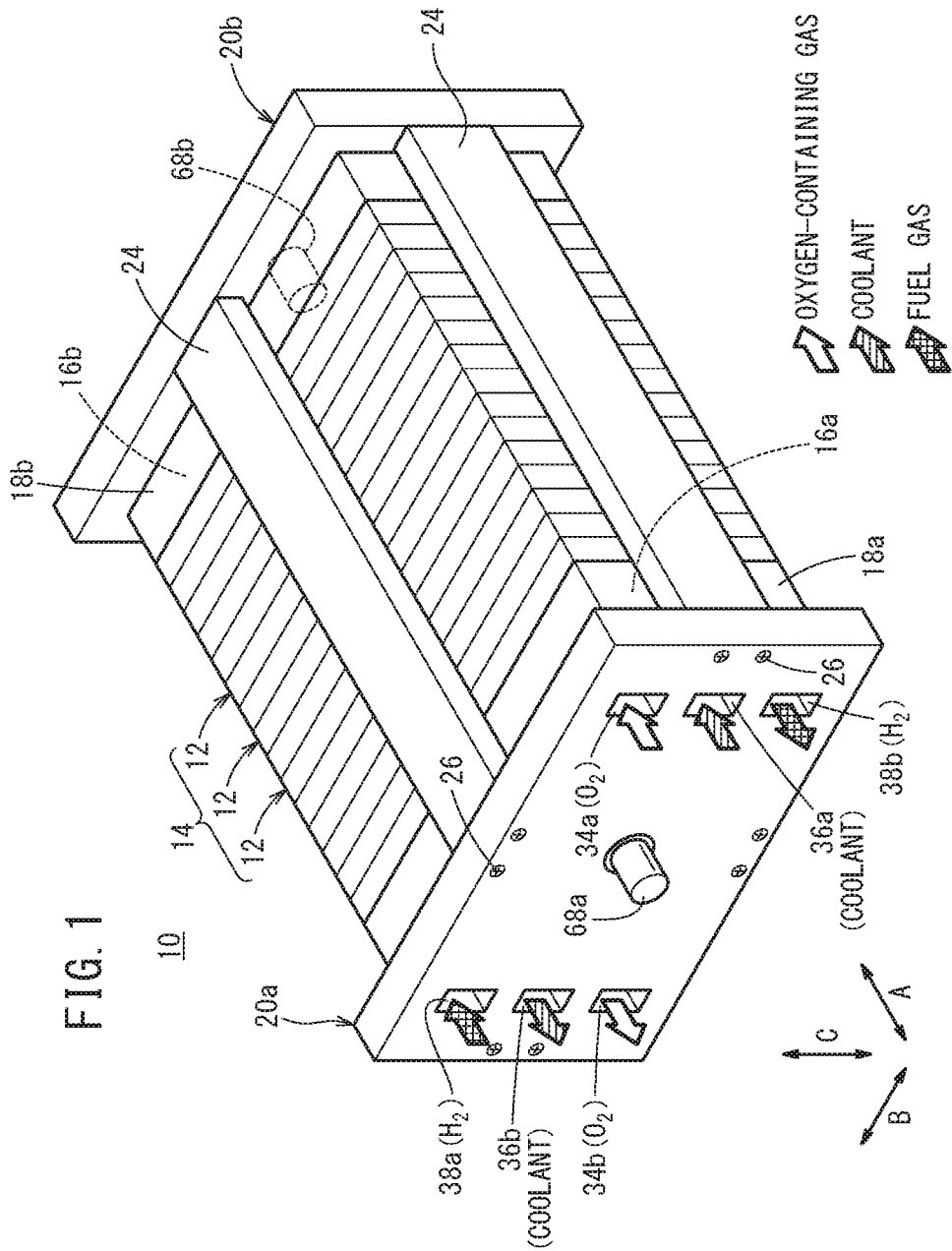
FIG. 1 is a perspective view showing a fuel cell stack.
Figure 2:
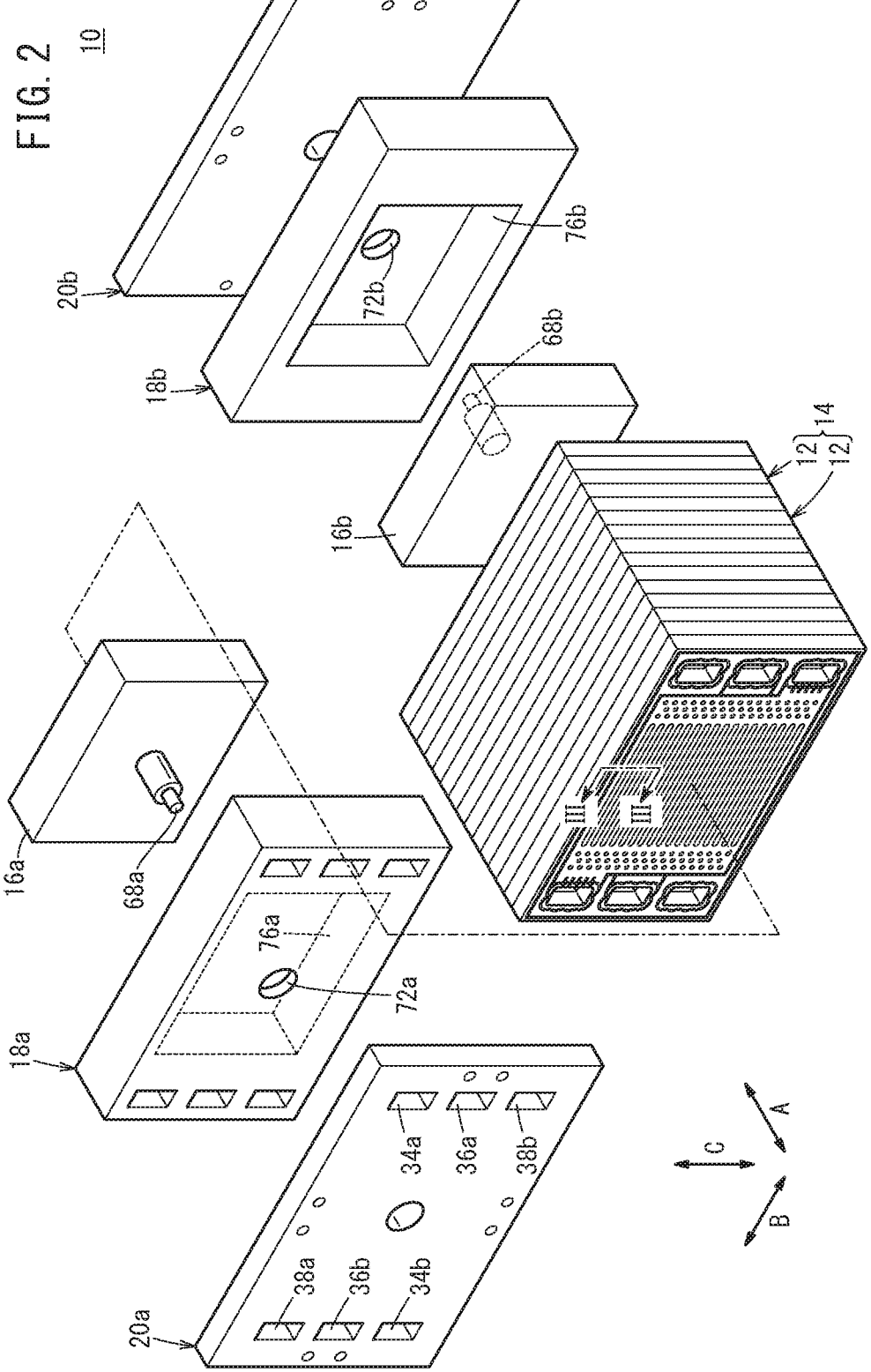
FIG. 2 is a partially-exploded, schematic perspective view showing the fuel cell stack.

As shown in FIGS. 1 and 2, a fuel cell stack 10 includes a stack body 14 formed by stacking a plurality of power generation cells (fuel cells) 12 in a horizontal direction (indicated by an arrow A) or in a gravity direction (indicated by an arrow C). For example, the fuel cell stack 10 is mounted in a fuel cell vehicle such as a fuel cell electric automobile (not shown).

At one end of the stack body 14 in the stacking direction indicated by the arrow A, a terminal plate 16a is provided. An insulator 18a is provided outside the terminal plate 16a, and an end plate 20a is provided outside the insulator 18a (see FIG. 2). At the other end of the stack body 14 in the stacking direction, a terminal plate 16b is provided. An insulator 18b is provided outside the terminal plate 16b, and an end plate 20b is provided outside the insulator 18b.

As shown in FIG. 1, each of the end plates 20a, 20b has a laterally elongated (or longitudinally elongated) rectangular shape. Coupling bars 24 are positioned between the sides of the end plates 20a, 20b. Both ends of the coupling bars 24 are fixed to inner surfaces of the end plates 20a, 20b through bolts 26 to apply a tightening load to a plurality of stacked power generation cells 12 in the stacking direction indicated by the arrow A. It should be noted that the fuel cell stack 10 may have a casing including the end plates 20a, 20b, and the stack body 14 may be placed in the casing.

Figure 3:
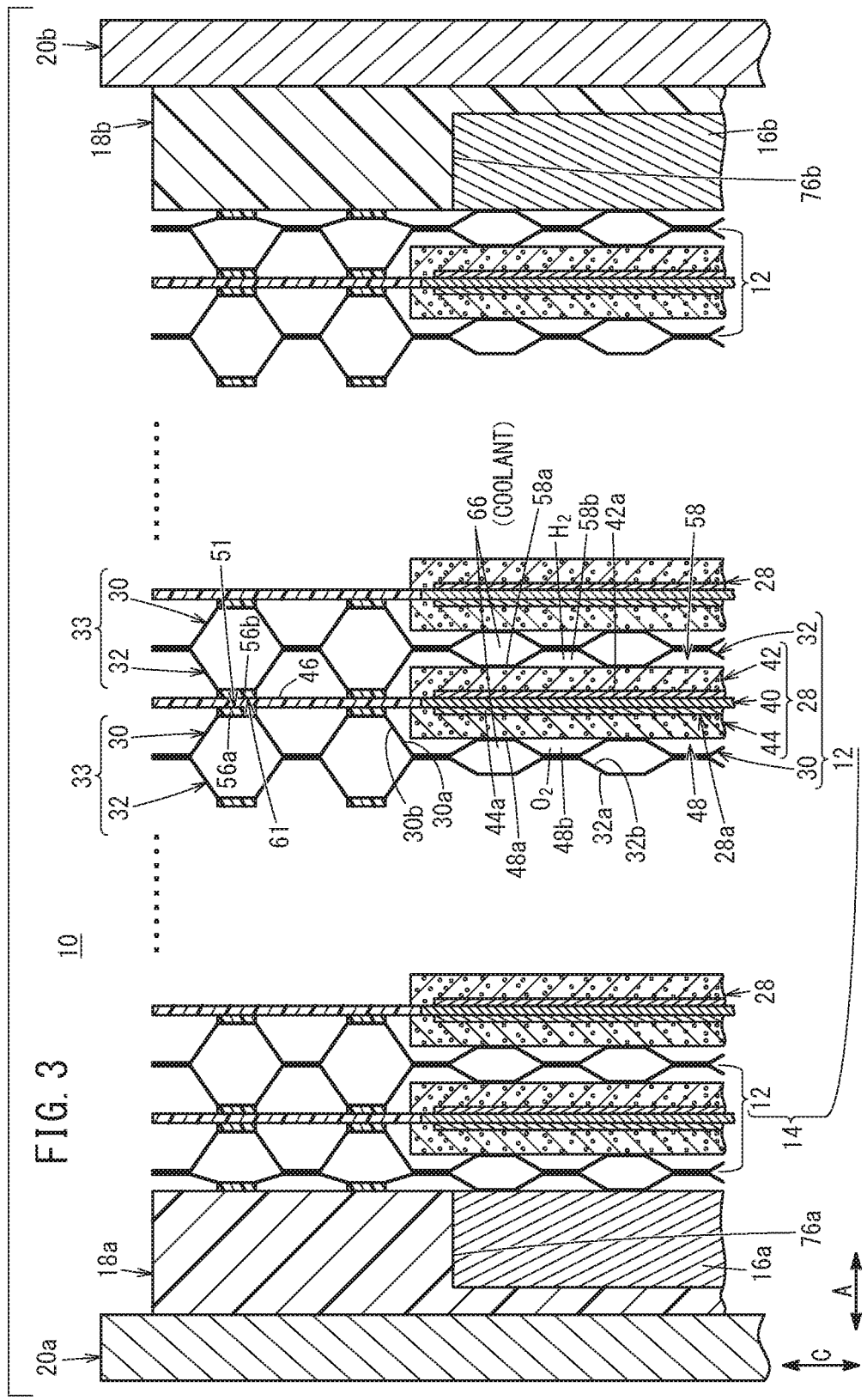
FIG. 3 is a cross sectional view showing the fuel cell stack, taken along a line III-III in FIG. 2.
Figure 4:
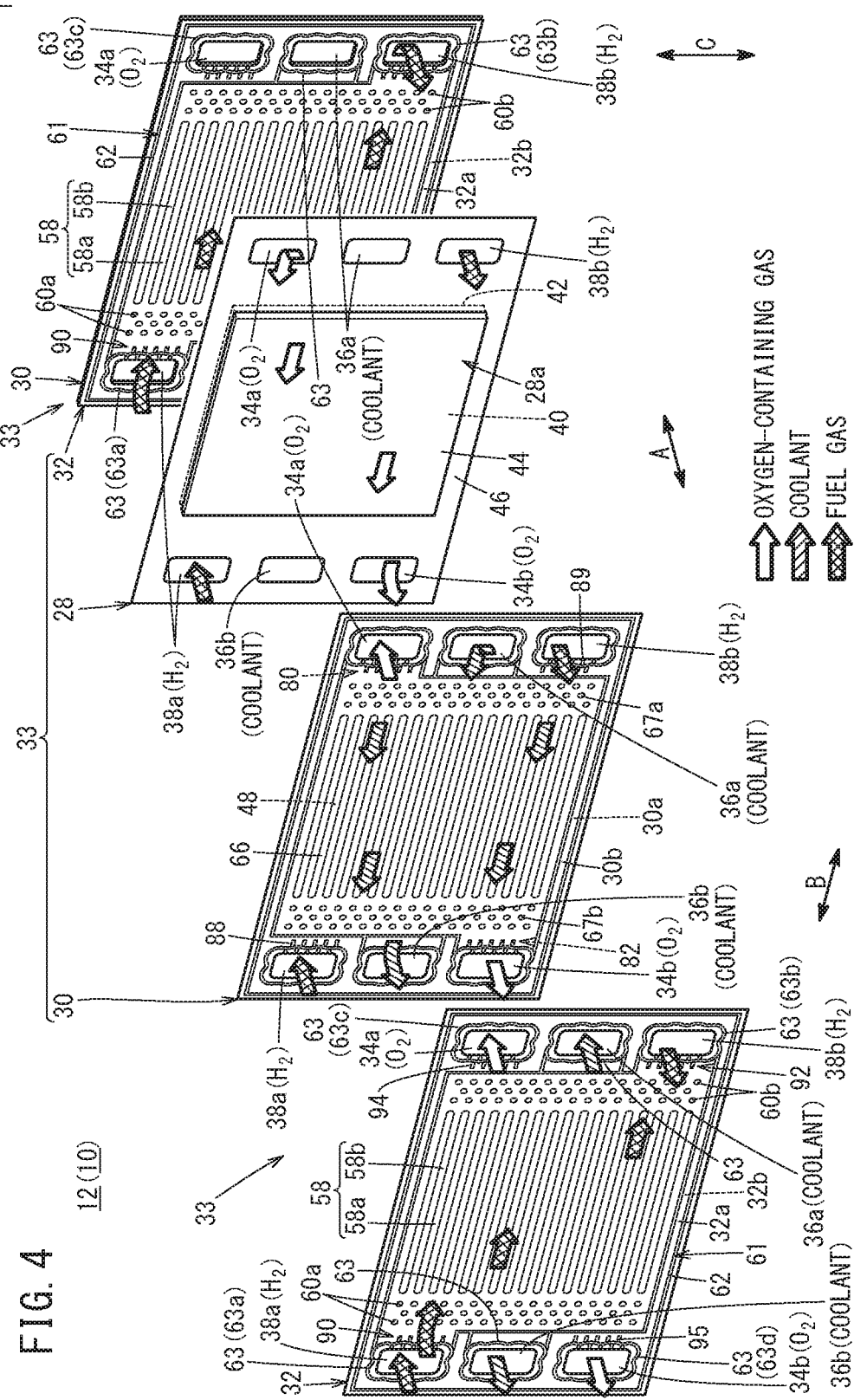
FIG. 4 is an exploded perspective view showing a power generation cell of the fuel cell stack.

As shown in FIGS. 3 and 4, in the power generation cell 12, a resin film equipped MEA 28 is sandwiched between a first metal separator 30 and a second metal separator 32. Each of the first metal separator 30 and the second metal separator 32 is formed by press forming of a metal thin plate to have a corrugated shape in cross section. For example, the metal plate is a steel plate, a stainless steel plate, an aluminum plate, a plate steel plate, or a metal plate having an anti-corrosive surface by surface treatment. Outer ends of the first metal separator 30 and the second metal separator 32 are joined together by welding, brazing, crimpling, etc. to form a joint separator 33.

At one end of the power generation cell 12 in the longitudinal direction indicated by an arrow B (horizontal direction in FIG. 4), an oxygen-containing gas supply passage 34a, a coolant supply passage 36a, and a fuel gas discharge passage 38b are provided. The oxygen-containing gas supply passage 34a, the coolant supply passage 36a, and the fuel gas discharge passage 38b extend through the power generation cell 12 in the direction indicated by the arrow A. The oxygen-containing gas supply passage 34a, the coolant supply passage 36a, and the fuel gas discharge passage 38b are arranged in the direction indicated by the arrow C. An oxygen-containing gas is supplied through the oxygen-containing gas supply passage 34a. A coolant is supplied through the coolant supply passage 36a. A fuel gas such as a hydrogen-containing gas is discharged through the fuel gas discharge passage 38b.

At the other end of the power generation cell 12 in the direction indicated by the arrow B, a fuel gas supply passage 38a, a coolant discharge passage 36b, and an oxygen-containing gas discharge passage 34b are arranged in the direction indicated by the arrow C. The fuel gas supply passage 38a, the coolant discharge passage 36b, and the oxygen-containing gas discharge passage 34b extend through the power generation cell 12 in the direction indicated by the arrow A. The fuel gas is supplied through the fuel gas supply passage 38a. The coolant is discharged through the coolant discharge passage 36b. The oxygen-containing gas is discharged through the oxygen-containing gas discharge passage 34b. The layout of the oxygen-containing gas supply passage 34a, the oxygen-containing gas discharge passage 34b, the fuel gas supply passage 38a, and the fuel gas discharge passage 38b is not limited to the above embodiment, and may be changed depending on the required specification.

As shown in FIG. 3, the resin film equipped MEA 28 includes a membrane electrode assembly 28a, and a frame shaped resin film 46 provided in the outer portion of the membrane electrode assembly 28a. The membrane electrode assembly 28a includes an electrolyte membrane 40, and an anode 42 and a cathode 44 sandwiching the electrolyte membrane 40.

For example, the electrolyte membrane 40 includes a solid polymer electrolyte membrane (cation ion exchange membrane). For example, the solid polymer electrolyte membrane is a thin membrane of perfluorosulfonic acid containing water. The electrolyte membrane 40 is sandwiched between the anode 42 and the cathode 44. A fluorine based electrolyte may be used as the electrolyte membrane 40. Alternatively, an HC (hydrocarbon) based electrolyte may be used as the electrolyte membrane 40. The surface size (outer size) of the electrolyte membrane 40 is smaller than the surface sizes (outer sizes) of the anode 42 and the cathode 44.

The frame shaped resin film 46 is sandwiched between outer marginal portion of the anode 42 and the outer marginal portion of the cathode 44. The inner end surface of the resin film 46 is positioned close to, overlapped with, or contacts the outer end surface of the electrolyte membrane 40. As shown in FIG. 4, at one end of the resin film 46 in the direction indicated by the arrow B, the oxygen-containing gas supply passage 34a, the coolant supply passage 36a, and the fuel gas discharge passage 38b are provided. At the other end of the resin film 46 in the direction indicated by the arrow B, the fuel gas supply passage 38a, the coolant discharge passage 36b, and the oxygen-containing gas discharge passage 34b are provided.

For example, the resin film 46 is made of PPS (poly phenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified poly phenylene ether), PET (polyethylene terephthalate), PBT (polybutylene terephthalate), or modified polyolefin. It should be noted that the electrolyte membrane 40 may be configured to protrude outward without using the resin film 46. Alternatively, a frame shaped film may be provided on both sides of the electrolyte membrane 40 which protrudes outward.

Figure 5:
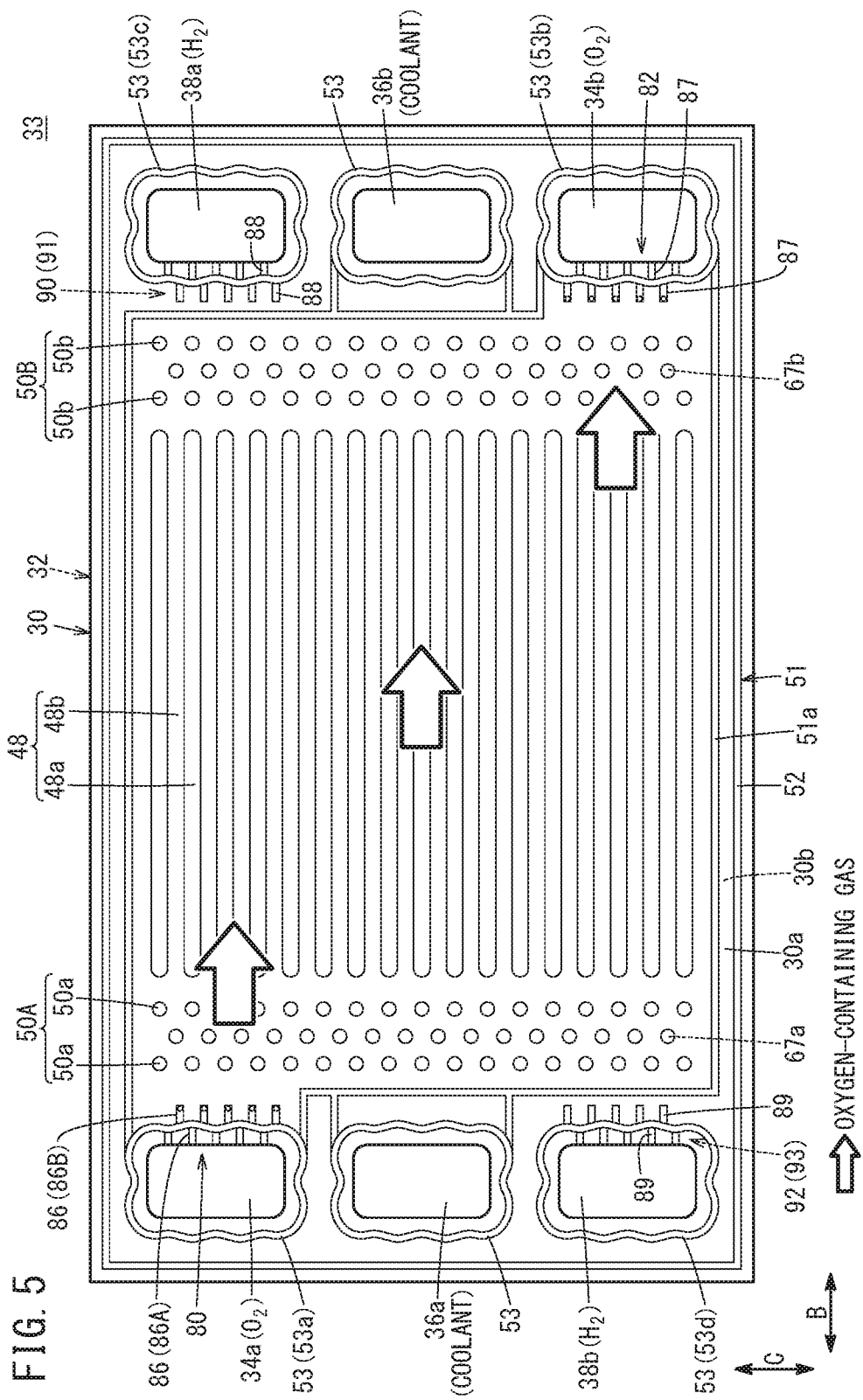
FIG. 5 is a front view showing a joint separator, as viewed from a first metal separator.

As shown in FIG. 4, an oxygen-containing gas flow field 48 is provided on a surface 30a of the first metal separator 30 facing the resin film equipped MEA 28 (hereinafter referred to as the "surface 30a"). For example, the oxygen-containing gas flow field 48 extends in the direction indicated by the arrow B. As shown in FIG. 5, the oxygen-containing gas flow field 48 is connected to (in fluid communication with) the oxygen-containing gas supply passage 34a and the oxygen-containing gas discharge passage 34b. The oxygen-containing gas flow field 48 includes straight flow grooves 48b between a plurality of ridges 48a extending in the direction indicated by the arrow B. Instead of the plurality of straight flow grooves 48b, a plurality of wavy or serpentine flow grooves may be provided.

An inlet buffer 50A is provided on the surface 30a of the first metal separator 30, between the oxygen-containing gas supply passage 34a and the oxygen-containing gas flow field 48. The inlet buffer 50A includes a plurality of boss arrays each including a plurality of bosses 50a arranged in a direction indicated by an arrow C. Further, an outlet buffer 50B is provided on the surface 30a of the first metal separator 30, between the oxygen-containing gas discharge passage 34b and the oxygen-containing gas flow field 48. The outlet buffer 50B includes a plurality of boss arrays each including a plurality of bosses 50b.

On a surface 30b of the first metal separator 30 on the other side of the oxygen-containing gas flow field 48, boss arrays each including a plurality of bosses 67a arranged in the direction indicated by the arrow C are provided between the boss arrays of the inlet buffer 50A, and boss arrays each including a plurality of bosses 67b arranged in the direction indicated by the arrow C are provided between the boss arrays of the outlet buffer 50B. The bosses 67a, 67b form a buffer on the coolant surface.

A first seal line (metal bead seal) 51 is formed on the surface 30a of the first metal separator 30 by press forming. The first seal line 51 is expanded toward the resin film equipped MEA 28. The first seal line 51 includes an inner bead 51a, an outer bead 52, and a plurality of passage beads (bead seals) 53. As shown in FIG. 3, resin material 56a is fixed to protruding front surfaces of the first seal line 51 by printing, coating, etc. For example, polyester fiber is used as the resin material 56a. The resin material 56a may be provided on the part of the resin film 46. The resin material 56a is not essential. The resin material 56a may be dispensed with.

As shown in FIG. 5, the inner bead 51a protrudes from the surface 30a of the first metal separator 30 toward the resin film equipped MEA 28 (FIG. 4). The inner bead 51a is provided around the oxygen-containing gas flow field 48, the inlet buffer 50A, and the outlet buffer 50B. The outer bead 52 protrudes from the surface 30a of the first metal separator 30 toward the resin film equipped MEA 28 (FIG. 4), and the outer bead 52 is provided along the outer marginal portion of the surface 30a of the first metal separator 30.

The plurality of passage beads 53 protrude from the surface 30a of the first metal separator 30 toward the resin film equipped MEA 28 (FIG. 4). The passage beads 53 are provided around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b, respectively.

The passage bead 53 has a wavy shape in a plan view. Each side of the passage bead 53 may have a straight shape in a plan view.

Figure 6:
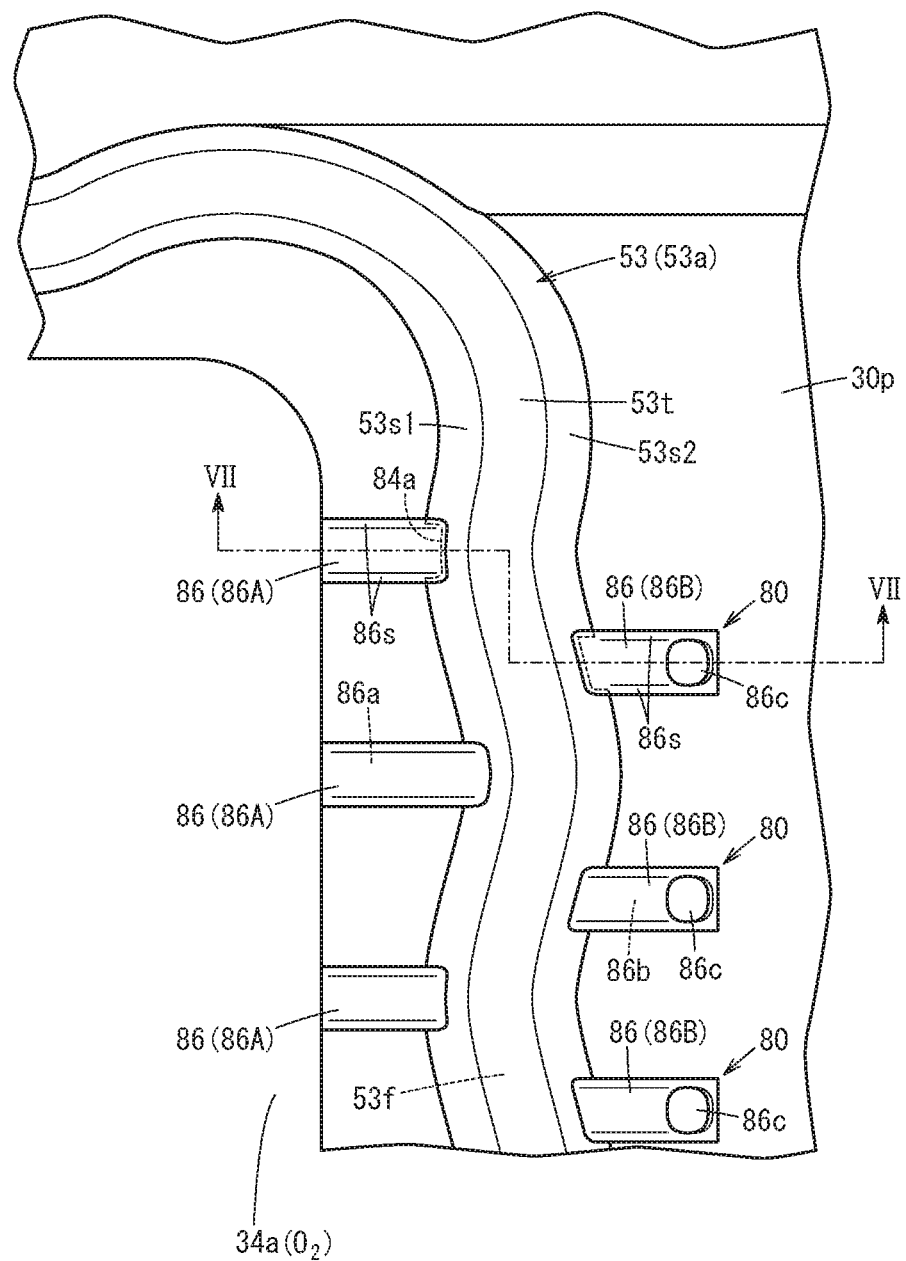
FIG. 6 is a view showing main components of a bead seal around an oxygen-containing gas supply passage in a first metal separator.
Figure 7:
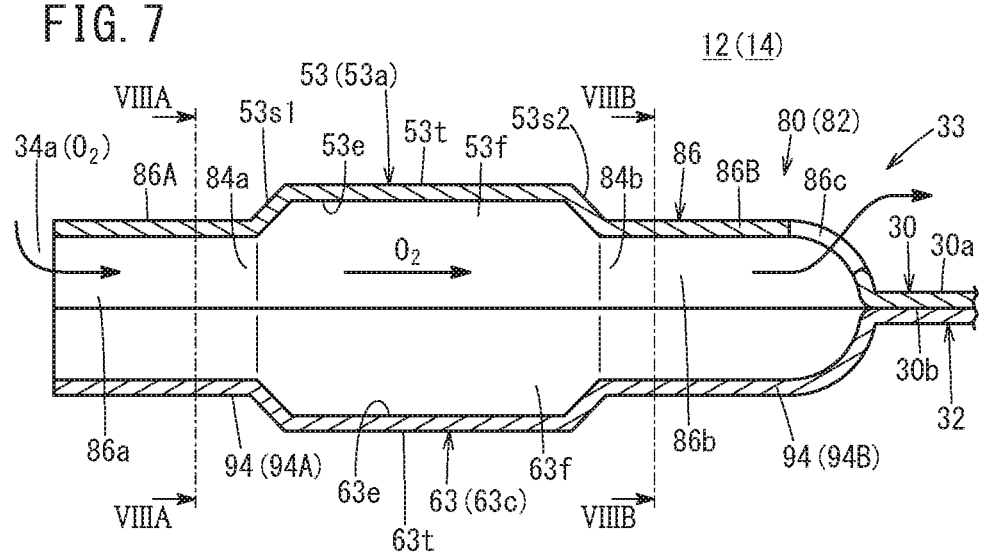
FIG. 7 is a cross sectional view taken along a line VII-VII in FIG. 6.

As shown in FIGS. 6 and 7, a passage bead 53a includes an inner side wall 53s1 and an outer side wall 53s2 standing upright from a base plate 30p of the first metal separator 30, and a top part 53t connecting the inner side wall 53s1 and the outer side wall 53s2. The inner side wall 53s1 and the outer side wall 53s2 of the passage bead 53a are inclined from a separator thickness direction. Thus, the passage bead 53a has a trapezoidal shape in cross section taken along the separator thickness direction. Preferably, the inner side wall 53s1 and the outer side wall 53s2 are inclined at the same angle. It should be noted that the inner side wall 53s1 and the outer side wall 53s2 of the passage bead 53a may be in parallel to the separator thickness direction. That is, the passage bead 53a may have a rectangular shape in cross section taken along the separator thickness direction.

As shown in FIG. 5, the first metal separator 30 has bridge sections (connection channels) 80, 82 connecting the inside of the passage beads 53a, 53b (fluid passages 34a, 34b) around the oxygen-containing gas supply passage 34a and the oxygen-containing gas discharge passage 34b, and the outside (oxygen-containing gas flow field 48) of the passage beads 53a, 53b.

The bridge section 80 is provided in a part of the annular passage bead 53a formed around the oxygen-containing gas supply passage 34a, between the oxygen-containing gas flow field 48 and the oxygen-containing gas supply passage 34a. The bridge section 82 is provided in a part of the annular passage bead 53b formed around the oxygen-containing gas discharge passage 34b, between the oxygen-containing gas flow field 48 and the oxygen-containing gas discharge passage 34b.

The passage bead 53a and the passage bead 53b have the same structure. Further, the bridge section 80 adjacent to the oxygen-containing gas supply passage 34a and the bridge section 82 adjacent to the oxygen-containing gas discharge passage 34b have the same structure. Therefore, hereinafter, the structure of the passage bead 53a and the bridge section 80 will be described in detail as a representative example, and the detailed description about the structure of the passage bead 53b and the bridge section 82 will be omitted.

As shown in FIGS. 6 and 7, the bridge section 80 includes a plurality of tunnels 86 formed by press forming. The tunnels 86 protrude from a side wall of the passage bead 53a, and the tunnels 86 are expanded in the separator thickness direction. Specifically, the tunnels 86 include a plurality of inner tunnels 86A protruding from the inner side wall 53s1 of the passage bead 53a toward the oxygen-containing gas supply passage 34a, and outer tunnels 86B protruding from the outer side wall 53s2 of the passage bead 53a toward the oxygen-containing gas flow field 48 (FIG. 5).

The inner tunnels 86A and the outer tunnels 86B protrude from the passage bead 53a opposite to each other, in the separator surface direction (perpendicular to the stacking direction). The inner tunnels 86A are provided at intervals in the direction in which the passage bead 53a extends. An end of each of the inner tunnels 86A opposite to the side connected to the passage bead 53a is opened in the oxygen-containing gas supply passage 34a.

The outer tunnels 86B are provided at intervals in the direction in which the passage bead 53a extends. An opening 86c is provided at an end of the outer tunnel 86B opposite to a portion connected to the passage bead 53a. The opening 86c extends through the outer tunnel 86B, from the inside to the outside of the outer tunnel 86B.

In the embodiment of the present invention, the plurality of inner tunnels 86A and the plurality of outer tunnels 86B are provided alternately (in a zigzag pattern) along the passage bead 53a. The plurality of inner tunnels 86A and the plurality of outer tunnels 86B may be provided to face each other through the passage bead 53a.

As shown in FIG. 7, a recess 53e is provided in the first metal separator 30, on the back side of the ridge shaped passage bead 53a. The recess 53e forms an internal space 53f of the passage bead 53a. The recess 53e of the first metal separator 30 faces the recess 63e of the second metal separator 32 on the back surface of a passage bead 63. In the structure, the internal space 53f of the passage bead 53a of the first metal separator 30 is connected to an internal space 63f of the passage bead 63 of the second metal separator 32.

FIG. 7 shows cross sections of the first metal separator 30 and the second metal separator 32 in the state where the fuel cell stack 10 is assembled (in the state where a tightening load in the stacking direction is applied to the stack body 14, and the surface pressure produced by the tightening load is applied to the passage beads 53a, 63c). In the state before the fuel cell stack 10 is assembled, the top parts 53t, 63t of the passage beads 53, 63 may be curved in the protruding direction of the passage beads 53, 63. However, in the state after the fuel cell stack 10 is assembled, the top parts 53t, 63t of the passage beads 53, 63 have a flat shape as shown in FIG. 7.

The internal space 53f of the passage bead 53a and an internal space 86a of the inner tunnel 86A are connected to each other through a through hole 84a formed in the inner side wall 53s1 of the passage bead 53a. Therefore, the inner tunnel 86A connects the oxygen-containing gas supply passage 34a and the internal space 53f of the passage bead 53a.

The internal space 53f of the passage bead 53a and an internal space 86b of the outer tunnel 86B are connected to each other through a through hole 84b formed in the outer side wall 53s2 of the passage bead 53a. Therefore, the outer tunnel 86B connects the internal space 53f of the passage bead 53a and the oxygen-containing gas flow field 48 (see FIG. 5).

In FIG. 6, the plurality of tunnels 86 have the same shape in cross section of at least the root connected to the passage bead 53a (shape in cross section in a direction perpendicular to the direction in which the tunnels 86 extend). Specifically, the roots of the inner tunnels 86A have the same shape in cross section. Further, the roots of the outer tunnels 86B have the same shape in cross section. Further, the roots of the inner tunnels 86A and the roots of the outer tunnels 86B have the same shape in cross section. With regard to the tunnels 86, the "same" shape in cross section herein do not require that the tunnels 86 have completely the same shape in cross section. It is sufficient that the tunnels 86 have substantially the same surface pressure of the passage bead 53a. Further, the tunnels 86 having the tolerable difference of the shape in cross section are regarded as the "same", and allowable (this point is also true of other tunnels 87, 88, 89, 91, 93, 94, 95 described later. The plurality of tunnels 86 have the same width (dimension of the tunnels 86 in a direction perpendicular to the direction in which the tunnels 86 protrude from the passage bead 53a).

Figure 8A:
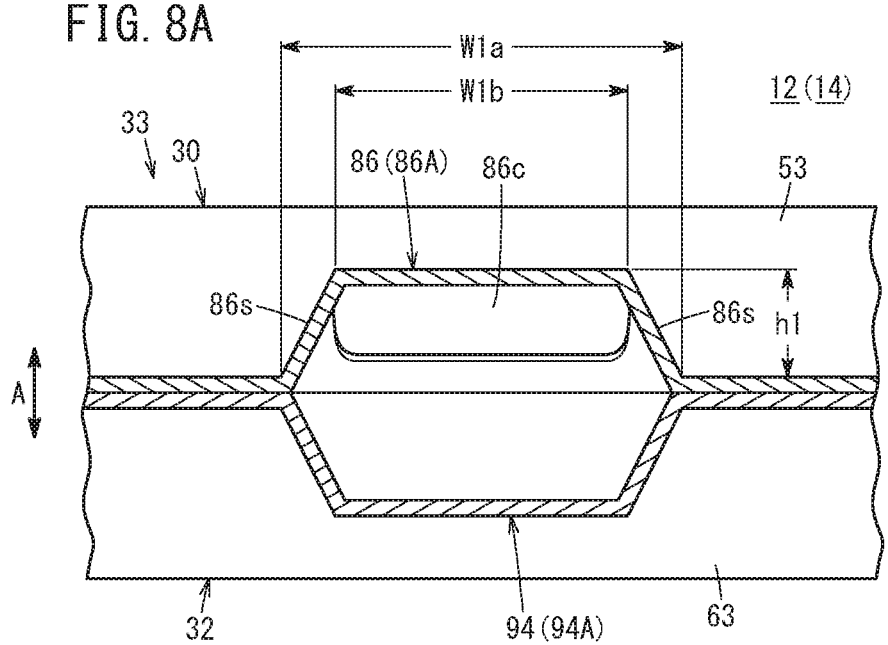
FIG. 8A is a cross sectional view taken along a line VIIIA-VIIIA in FIG. 7.
Figure 8B:
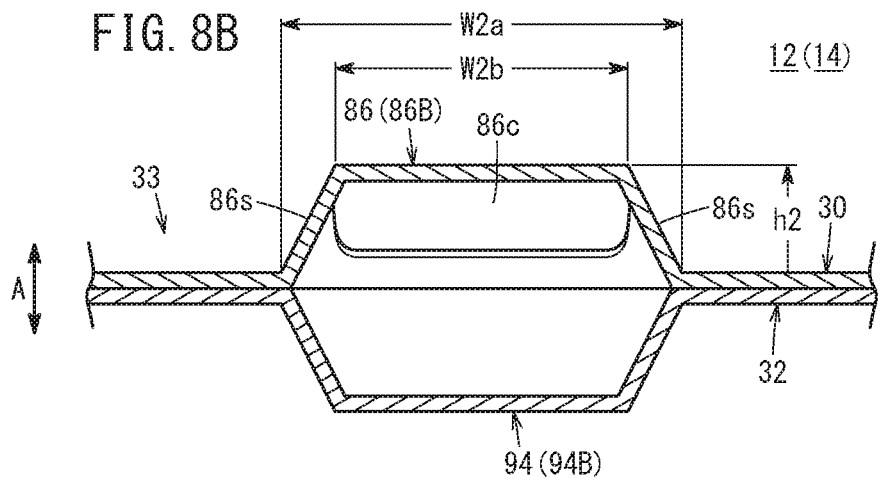
FIG. 8B is a cross sectional view taken along a line VIIIB-VIIIB in FIG. 7.

As shown in FIGS. 8A and 8B, each of the tunnels 86 has a trapezoidal shape in cross section tapered toward the ridge shaped front end. Specifically, side walls 86s of the tunnel 86 are inclined from the separator thickness direction (indicated by the arrow A). The plurality of tunnels 86 having the trapezoidal shape in cross section have the same bottom side length, the upper side length, and the height, respectively, in cross section of the root. Further, a bottom side length W1a, an upper side length W1b, and a height h1 (FIG. 8A) at the root of the plurality of inner tunnels 86A having the trapezoidal shape in cross section are the same as a bottom side length W2a, an upper side length W2b, and a height h2 (FIG. 8B) at the root of the plurality of outer tunnels 86B having the trapezoidal shape in cross section.

It should be noted that the shape of the plurality of tunnels 86 in cross section is not limited to the trapezoidal shape. The tunnels 86 may have a rectangular shape, circular arc shape, etc. Portions of the plurality of tunnels 86 other than the root (portion closer to the front end, than from the root) may have the same shape, or may have different shapes.

As shown in FIG. 5, the bridge section 82 includes the plurality of tunnels 87 protruding from the passage bead 53b around the oxygen-containing gas discharge passage 34b. The tunnels 87 have the same structure as the above described tunnels 86 adjacent to the oxygen-containing gas supply passage 34a.

Figure 9:
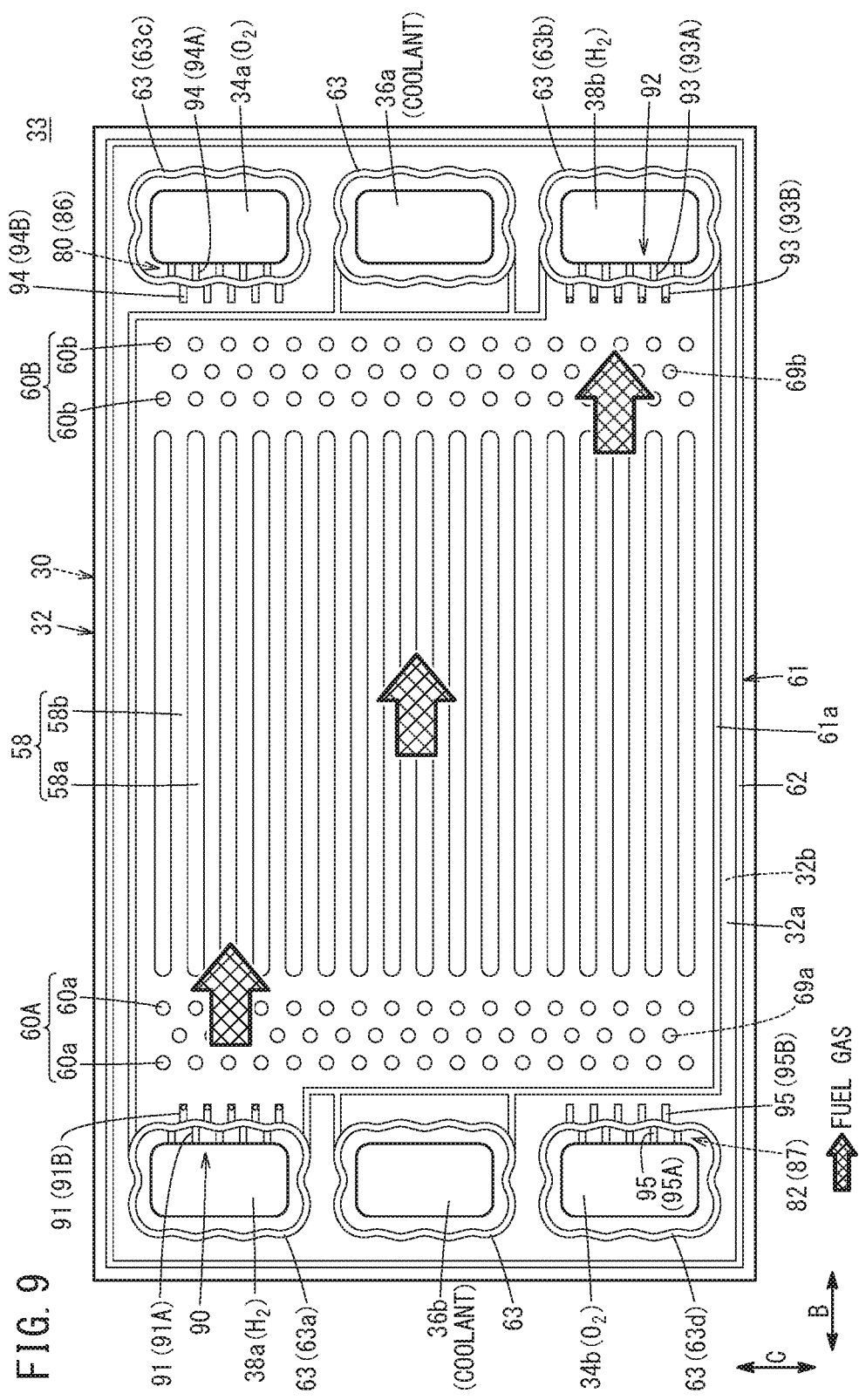
FIG. 9 is a front view of a joint separator, as viewed from a second metal separator.

As shown in FIG. 9, the plurality of tunnels 94 are provided in the second metal separator 32. The tunnels 94 face the plurality of tunnels 86 provided in the first metal separator 30, and protrude in the separator surface direction from the passage bead 63c around the oxygen-containing gas supply passage 34a (see also FIG. 7). As shown in FIGS. 8A and 8B, the tunnels 94 are formed by press forming, to protrude toward the resin film equipped MEA 28 (FIG. 4), in an opposite direction from the plurality of tunnels 86 provided in the first metal separator 30. As in the case of the tunnels 86, the tunnels 94 have a trapezoidal shape in cross section.

As shown in FIGS. 7 to 9, the tunnels 94 provided in the second metal separator 32 includes a plurality of inner tunnels 94A and a plurality of outer tunnels 94B facing the inner tunnels 86A and the outer tunnels 86B (FIG. 5) provided in the first metal separator 30, respectively. The plurality of tunnels 94 have the same shape in cross section of at least the root connected to the passage bead 63c.

Further, as shown in FIG. 9, the second metal separator 32 includes the plurality of tunnels 95 facing the plurality of tunnels 87 (FIG. 5) provided adjacent to the oxygen-containing gas discharge passage 34b of the first metal separator 30. The tunnels 95 protrude from a passage bead 63d in the separator surface direction. The tunnels 95 provided adjacent to the oxygen-containing gas discharge passage 34b have the same structure as the tunnels 94 provided adjacent to the oxygen-containing gas supply passage 34a. Therefore, the tunnels 95 include a plurality of inner tunnels 95A and a plurality of outer tunnels 95B.

As shown in FIG. 4, the second metal separator 32 has a fuel gas flow field 58 on its surface 32a facing the resin film equipped MEA 28 of the second metal separator 32 (hereinafter referred to as the "surface 32a"). For example, the fuel gas flow field 58 extends in the direction indicated by the arrow B. As shown in FIG. 9, the fuel gas flow field 58 is connected to (in fluid communication with) the fuel gas supply passage 38a and the fuel gas discharge passage 38b. The fuel gas flow field 58 includes straight flow grooves 58b between a plurality of ridges 58a extending in the direction indicated by the arrow B. Instead of the straight flow grooves 58b, wavy or serpentine flow grooves may be provided.

An inlet buffer 60A is provided on the surface 32a of the second metal separator 32, between the fuel gas supply passage 38a and the fuel gas flow field 58. The inlet buffer 60A includes a plurality of boss arrays each including a plurality of bosses 60a arranged in the direction indicated by the arrow C. Further, an outlet buffer 60B is provided on the surface 32a of the second metal separator 32, between the fuel gas discharge passage 38b and the fuel gas flow field 58.

The outlet buffer 60B includes a plurality of boss arrays each including a plurality of bosses 60b.

On a surface 32b of the second metal separator 32 on the other side of the fuel gas flow field 58, boss arrays each including a plurality of bosses 69a arranged in the direction indicated by the arrow C are provided between the boss arrays of the inlet buffer 60A, and boss arrays each including a plurality of bosses 69b arranged in the direction indicated by the arrow C are provided between the boss arrays of the outlet buffer 60B. The bosses 69a, 69b form a buffer on the coolant surface.

A second seal line 61 is formed on the surface 32a of the second metal separator 32 by press forming. The second seal line 61 is expanded toward the resin film equipped MEA 28. The second seal line 61 includes an inner bead 61a, an outer bead 62, and a plurality of passage beads (bead seals) 63. The inner bead 61a protrudes from the surface 32a of the second metal separator 32 toward the resin film equipped MEA 28. The inner bead 61a is formed around the fuel gas flow field 58, the inlet buffer 60A, and the outlet buffer 60B. The outer bead 62 protrudes from the surface 32a of the second metal separator 32. The outer bead 62 is formed along the outer marginal portion of the surface 32a of the second metal separator 32.

As shown in FIG. 3, resin material 56b is fixed to protruding front end surfaces of the second seal line 61 by printing, coating, etc. For example, polyester fiber is used as the resin material 56b. The resin material 56b may be provided on the part of the resin film 46. The resin material 56b is not essential. The resin material 56b may be dispensed with.

As shown in FIG. 9, the plurality of passage beads 63 protrude from the surface 32a of the second metal separator 32. The passage beads 63 are provided around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b, respectively. Passage beads 63a, 63b have the same structure as the passage bead 53a, 53b (FIG. 5) provided in the first metal separator 30.

The second metal separator 32 has bridge sections (connection channels) 90, 92 connecting the inside of the passage beads 63a, 63b (fluid passages 38a, 38b) provided around the fuel gas supply passage 38a and the fuel gas discharge passage 38b, respectively, and the outside (fuel gas flow field 58) of the passage beads 63a, 63b.

The bridge section 90 is provided in a part of the annular passage bead 63a formed around the fuel gas supply passage 38a, between the fuel gas flow field 58 and the fuel gas supply passage 38a. The bridge section 92 is provided in a part of the annular passage bead 63b formed around the fuel gas discharge passage 38b, between the fuel gas flow field 58 and the fuel gas discharge passage 38b.

The bridge sections 90, 92 provided in the second metal separator 32 have the same structure as the above bridge sections 80, 82 (FIG. 5) provided in the first metal separator 30. That is, the bridge section 90 has the plurality of tunnels 91 protruding from a side wall of the passage bead 63a. The tunnels 91 have the same shape in cross section of at least the root connected to the passage bead 63a. The plurality of tunnels 91 include a plurality of inner tunnels 91A protruding from the inner side wall of the passage bead 63a toward the fuel gas supply passage 38a, and a plurality of outer tunnels 91B protruding from an outer side wall of the passage bead 63a toward the fuel gas flow field 58.

The bridge section 92 includes the plurality of tunnels 93 protruding from the side wall of the passage bead 63b. The tunnels 93 have the same shape in cross section of at least the root connected to the passage bead 63b. The tunnels 93 include a plurality of inner tunnels 93A protruding from an inner side wall of the passage bead 63b toward the fuel gas discharge passage 38b, and a plurality of outer tunnels 93B protruding from an outer side wall of the passage bead 63b toward the fuel gas flow field 58.

As shown in FIG. 5, the first metal separator 30 has the plurality of tunnels 88 facing the plurality of tunnels 91 provided in the second metal separator 32 (bridge section 90) (FIG. 9). The tunnels 88 protrude in the separator surface direction from a passage bead 53c around the fuel gas supply passage 38a. The tunnels 88 have the same structure as the tunnels 94 described above (FIGS. 7 to 9). The tunnels 88 have the same shape in cross section of at least the root connected to the passage bead 53c.

Further, the first metal separator 30 has the plurality of tunnels 89 facing the plurality of tunnels 93 (bridge section 92) provided in the second metal separator 32. The tunnels 89 protrude from a passage bead 53d around the fuel gas discharge passage 38b in the separator surface direction. The tunnels 89 have the same structure as the tunnels 94 described above (FIGS. 7 to 9). The tunnels 89 have the same shape in cross section of at least the root connected to the passage bead 53d.

As shown in FIGS. 3 and 4, a coolant flow field 66 is formed between the surface 30b of the first metal separator 30 and the surface 32b of the second metal separator 32 that are joined together. The coolant flow field 66 is connected to (in fluid communication with) the coolant supply passage 36a and the coolant discharge passage 36b. The coolant flow field 66 is formed by stacking together a back surface of the first metal separator 30 (the back side of the oxygen-containing gas flow field 48) and a back surface of the second metal separator 32 (the back side of the fuel gas flow field 58). The first metal separator 30 and the second metal separator 32 are joined together by welding outer ends and areas around the fluid passages. The first metal separator 30 and the second metal separator 32 may be joined together by brazing, instead of welding.

As shown in FIG. 2, the terminal plates 16a, 16b are made of electrically conductive material. For example, the terminal plates 16a, 16b are made of metal such as copper, aluminum, or stainless steel. Terminals 68a, 68b are provided at substantially the central positions of the terminal plates 16a, 16b. The terminals 68a, 68b extend outward in the stacking direction.

The insulators 18a, 18b are made of insulating material such as polycarbonate (PC) or phenol resin. Recesses 76a, 76b are formed at central positions of the insulators 18a, 18b. The recesses 76a, 76b are opened toward the stack body 14. Holes 72a, 72b are formed in the bottom surfaces of the recesses 76a, 76b.

The oxygen-containing gas supply passage 34a, the coolant supply passage 36a, and the fuel gas discharge passage 38b are provided at one end of the insulator 18a and the end plate 20a in the direction indicated by the arrow B. The fuel gas supply passage 38a, the coolant discharge passage 36b, and the oxygen-containing gas discharge passage 34b are provided at the other end of the insulator 18a and the end plate 20a in the direction indicated by the arrow B.

As shown in FIGS. 2 and 3, the terminal plate 16a is placed in the recess 76a of the insulator 18a, and the terminal plate 16b is placed inside the recess 76b of the insulator 18b.

As shown in FIG. 1, the coupling bars 24 are provided between the sides of the end plates 20a, 20b. Both ends of the coupling bars 24 are fixed to inner surfaces of the end plates 20a 20b through the bolts 26 to apply a tightening load to the stack body 14, and assemble the components of the fuel cell stack 10.

Operation of the fuel cell stack 10 having the above structure will be described below.

First, as shown in FIG. 1, an oxygen-containing gas such as air is supplied to the oxygen-containing gas supply passage 34a of the end plate 20a. A fuel gas such as a hydrogen-containing gas is supplied to the fuel gas supply passage 38a of the end plate 20a. Coolant such as pure water, ethylene glycol, oil is supplied to the coolant supply passage 36a of the end plate 20a.

As shown in FIG. 4, the oxygen-containing gas flows from the oxygen-containing gas supply passage 34a to the oxygen-containing gas flow field 48 of the first metal separator 30 through the bridge section 80 (see FIG. 5). At this time, as shown in FIG. 7, the oxygen-containing gas flows temporarily from the oxygen-containing gas supply passage 34a toward the surface 30b of the first metal separator 30 (between the first metal separator 30 and the second metal separator 32). The oxygen-containing gas flows into the plurality of tunnels 86, and flows through the internal space 53f of the passage bead 53a. Then, the oxygen-containing gas flows from the opening 86c toward the surface 30a of the first metal separator 30. Then, as shown in FIG. 4, the oxygen-containing gas flows along the oxygen-containing gas flow field 48 in the direction indicated by the arrow B, and the oxygen-containing gas is supplied to the cathode 44 of the membrane electrode assembly 28a.

In the meanwhile, the fuel gas flows from the fuel gas supply passage 38a through the bridge section 90 (see FIG. 9), and the fuel gas flows into the fuel gas flow field 58 of the second metal separator 32. The fuel gas moves along the fuel gas flow field 58 in the direction indicated by the arrow B, and the fuel gas is supplied to the anode 42 of the membrane electrode assembly 28a.

Thus, in each of the membrane electrode assemblies 28a, the oxygen-containing gas supplied to the cathode 44 and the fuel gas supplied to the anode 42 are partially consumed in electrochemical reactions in a second electrode catalyst layer 44a and a first electrode catalyst layer 42a to generate electricity.

Then, after the oxygen-containing gas supplied to the cathode 44 is partially consumed at the cathode 44, the oxygen-containing gas flows from the oxygen-containing gas flow field 48 through the bridge section 82 to the oxygen-containing gas discharge passage 34b, and the oxygen-containing gas is discharged along the oxygen-containing gas discharge passage 34b in the direction indicated by the arrow A. Likewise, after the fuel gas supplied to the anode 42 is partially consumed at the anode 42, the fuel gas flows from the fuel gas flow field 58 through the bridge section 92 to the fuel gas discharge passage 38b, and the fuel gas is discharged along the fuel gas discharge passage 38b in the direction indicated by the arrow A.

Further, the coolant supplied to the coolant supply passage 36a flows into the coolant flow field 66 between the first metal separator 30 and the second metal separator 32, and then, the coolant flows in the direction indicated by the arrow B. After the coolant cools the membrane electrode assembly 28a, the coolant is discharged from the coolant discharge passage 36b.

In this case, the power generation cell 12 including the first metal separator 30 and the second metal separator 32 (fuel cell stack 10) according to the embodiment of the present invention offers the following advantages.

In the first metal separator 30, the plurality of tunnels 86 connected to the passage bead 53a around the oxygen-containing gas supply passage 34a have the same shape in cross section of the root connected to the passage bead 53a. Also, the plurality of tunnels 87 connected to the passage bead 53b around the oxygen-containing gas discharge passage 34b have the same shape in cross section of the root connected to the passage bead 53b. Further, the plurality of tunnels 88 connected to the passage bead 53c around the fuel gas supply passage 38a have the same shape in cross section of the root connected to the passage bead 53c. Further still, the plurality of tunnels 89 connected to the passage bead 53d around the fuel gas discharge passage 38b have the same shape in cross section of the root connected to the passage bead 53d.

In the structure, variation in the rigidity of the passage beads 53a to 53d at positions connected to the tunnels 86, 87, 88, 89 is suppressed. Therefore, it is possible to achieve the simple and economical structure where uniform surface pressure (seal surface pressure) is applied to the passage beads 53a to 53d, and it is possible to achieve the desired sealing performance by the passage beads 53a to 53d easily. Therefore, local increase in the surface pressure is suppressed, and it is possible to suppress damage of the seal members due to application of the excessive load, and suppress damage of the resin film equipped MEA 28.

Also in the second metal separator 32 having the passage beads 63a to 63d and the tunnels 91, 93, 94, 95, the same advantages as described above are obtained. Hereinafter, while advantages of the tunnels 86 provided in the first metal separator 30 will be described as a representative example, the same advantages are obtained also in the other tunnels 87, 88, 89, 91, 93, 94, 95.

Each of the tunnels 86 provided in the first metal separator 30 has a trapezoidal shape in cross section. The tunnels 86 have the same bottom side length, the upper side length, and the height. In the structure, it is possible to obtain the tunnels 86 having the same shape in cross section.

The tunnels 86 include the inner tunnels 86A protruding from the inner side wall 53s1 of the passage bead 53a and the outer tunnels 86B protruding from the outer side wall 53s2 of the passage bead 53a. The inner tunnels 86A and the outer tunnels 86B are connected to the passage bead 53a alternately. In the structure, it is possible to suitably distribute the oxygen-containing gas which has been supplied into the oxygen-containing gas supply passage 34a toward the oxygen-containing gas flow field 48. Further, since the positions of the tunnels 86 are shifted from each other, between the inner side and the outer side, the surface pressure can be applied to the passage bead 53a more uniformly.

Further, since the inner tunnels 86A and the outer tunnels 86B have the same shape in cross section of the root connected to the passage bead 53a, the surface pressure can be applied to the passage bead 53a more uniformly.

The present invention is not limited to the above described embodiment. Various modifications may be made without departing from the gist of the present invention.

What is claimed is:

1. A fuel cell separator comprising:
   a fluid flow field configured to allow fluid of an oxygen-containing gas, a fuel gas, or a coolant to flow along an electrode surface;

a fluid passage connected to the fluid flow field and extending through the fuel cell separator in a separator thickness direction; and a bead seal used for sealing, the bead seal being formed around the fluid passage and protruding in the separator thickness direction, the fuel cell separator being stacked on a membrane electrode assembly, and a compression load being applied to the fuel cell separator in a stacking direction, wherein a plurality of tunnels protrude from a side wall of the bead seal, and are expanded in the separator thickness direction, the plurality of tunnels have same shape in cross section of a root connected to the bead seal, wherein the plurality of tunnels include a plurality of inner tunnels protruding from an inner side wall of the bead seal and a plurality of outer tunnels protruding from an outer side wall of the bead seal; and the plurality of inner tunnels and the plurality of outer tunnels are connected to the bead seal alternately.

2. The fuel cell separator according to claim 1, wherein each of the plurality of tunnels has a trapezoidal shape in cross section, and the plurality of tunnels have same bottom side length, same upper side length, and same height.

3. The fuel cell separator according to claim 1, wherein the the plurality of inner tunnels and the plurality of outer tunnels have same shape in cross section of a root connected to the bead seal.

4. The fuel cell separator according to claim 1, wherein another fuel cell separator is provided adjacent to the fuel cell separator; and the plurality of the tunnels of the fuel cell separator and a plurality of tunnels of the other fuel cell separator have same shape in cross section.

5. The fuel cell separator according to claim 1, wherein the plurality of tunnels have same width.

6. A power generation cell comprising a fuel cell separator and a membrane electrode assembly stacked on the fuel cell separator, the fuel cell separator comprising:

a fluid flow field configured to allow fluid of an oxygen-containing gas, a fuel gas, or a coolant to flow along an electrode surface;

a fluid passage connected to the fluid flow field and extending through the fuel cell separator in a separator thickness direction; and a bead seal used for sealing, the bead seal being formed around the fluid passage and protruding in the separator thickness direction, the fuel cell separator being stacked on the membrane electrode assembly, and a compression load being applied to the fuel cell separator in a stacking direction, wherein the fuel cell separator includes a plurality of tunnels protruding from a side wall of the bead seal, and are expanded in the separator thickness direction, the plurality of tunnels have same shape in cross section of a root connected to the bead seal, wherein the plurality of tunnels include a plurality of inner tunnels protruding from an inner side wall of the bead seal and a plurality of outer tunnels protruding from an outer side wall of the bead seal; and the plurality of inner tunnels and the plurality of outer tunnels are connected to the bead seal alternately.

\* \* \* \* \*